United States Patent
Banerjee et al.

(10) Patent No.: US 10,031,817 B2
(45) Date of Patent: *Jul. 24, 2018

(54) CHECKPOINT MECHANISM IN A COMPUTE EMBEDDED OBJECT STORAGE INFRASTRUCTURE

(71) Applicant: International Business Machines Corporation, Armonk, NY (US)

(72) Inventors: Pradipta K. Banerjee, Bangalore (IN); Sasikanth Eda, Vijayawada (IN); Deepak R. Ghuge, Sangamner (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/933,278

(22) Filed: Nov. 5, 2015

(65) Prior Publication Data

US 2017/0131923 A1    May 11, 2017

(51) Int. Cl.
*G06F 11/14* (2006.01)
*G06F 3/06* (2006.01)

(52) U.S. Cl.
CPC ......... *G06F 11/1471* (2013.01); *G06F 3/065* (2013.01); *G06F 3/0619* (2013.01); *G06F 3/0683* (2013.01); *G06F 2201/805* (2013.01)

(58) Field of Classification Search
USPC ......................................................... 714/6.1
See application file for complete search history.

(56) References Cited

U.S. PATENT DOCUMENTS

| | | | |
|---|---|---|---|
| 7,904,886 B2 | 3/2011 | Dufour et al. | |
| 8,015,564 B1 * | 9/2011 | Beyer | G06F 9/505 718/100 |
| 8,224,780 B2 | 7/2012 | Cargille et al. | |

(Continued)

FOREIGN PATENT DOCUMENTS

| | | |
|---|---|---|
| WO | 2009134932 A2 | 11/2009 |
| WO | 2011018646 A1 | 2/2011 |
| WO | 2014117295 A1 | 8/2014 |

OTHER PUBLICATIONS

Burt, "IBM Looking to 'Storlets' to Manage Object Storage", eWEEK, May 15, 2014, 3 pages, <http://www.eweek.com/print/storage/ibm-looking-to-storlets-to-manage-object-storage.html>.

(Continued)

*Primary Examiner* — Kamini B Patel
(74) *Attorney, Agent, or Firm* — Alexa L. Ashworth; Brian J. Kim; Brian M. Restauro (57) ABSTRACT

Embodiments of the present invention provide a method, computer program product, and computer system for leveraging checkpoint restart. The method includes determining a first set of work stages within a first computation algorithm. A set of permissions associated with the first set of work stages are identified, and the work stages are stored as checkpoints in either a public location or a private location. Upon deployment of a second computation algorithm, a second set of work stages within the second computation algorithm is compared to the first set of work stages. If the second set of work stages match with the first set of work stages, the second computation algorithm is executed using the checkpoint associated with the matching work stages.

13 Claims, 8 Drawing Sheets

(56) References Cited

U.S. PATENT DOCUMENTS

| | | | |
|---|---|---|---|
| 8,504,904 | B2 | 8/2013 | Aston |
| 9,501,493 | B1* | 11/2016 | Banerjee ........... G06F 17/30233 |
| 2004/0216130 | A1* | 10/2004 | Keller ................ G06F 11/1458 |
| | | | 719/315 |
| 2006/0156064 | A1* | 7/2006 | Damani .............. G06F 11/1471 |
| | | | 714/16 |
| 2012/0222034 | A1* | 8/2012 | Ishikawa ............ G06F 11/1438 |
| | | | 718/102 |
| 2012/0316846 | A1* | 12/2012 | Cohen ................. G11B 27/002 |
| | | | 703/2 |
| 2014/0297686 | A1* | 10/2014 | Lee ................... G06F 17/30477 |
| | | | 707/770 |
| 2015/0006487 | A1* | 1/2015 | Yang ...................... G06F 9/461 |
| | | | 707/649 |
| 2015/0235044 | A1* | 8/2015 | Cohen ..................... G06F 21/53 |
| | | | 726/17 |
| 2015/0235049 | A1* | 8/2015 | Cohen ................. G06F 21/6254 |
| | | | 726/28 |
| 2016/0139943 | A1* | 5/2016 | Bezbaruah .......... G06F 9/45558 |
| | | | 718/1 |
| 2016/0366068 | A1* | 12/2016 | Eda ....................... H04L 47/821 |
| 2017/0054796 | A1* | 2/2017 | Eda ..................... H04L 67/1002 |
| 2017/0083405 | A1* | 3/2017 | Basham .............. G06F 11/1451 |

OTHER PUBLICATIONS

Lezcano, "lxc-checkpoint—checkpoint a running container (not implemented yet)", Ubuntu Manpage, Printed Aug. 27, 2015, © 2010 Canonical Ltd., 1 page, <http://manpages.ubuntu.com/manpages/oneiric/man1/lxc-checkpoint.1.html>.

Lezcano, "lxc-restart—restart a container from a file (not implemented yet)", Ubuntu Manpage, Printed Aug. 27, 2015, © 2010 Canonical Ltd., 1 page, <http://manpages.ubuntu.com/manpages/natty/man1/lxc-restart.html>.

Lynch, "container-based checkpoint/restart prototype", LWN.net, Feb. 28, 2011, 2 pages, <http://lwn.net/Articles/430279/>.

Mirkin et al., "Containers checkpointing and live migration", Proceedings of the Linux Symposium, vol. Two, Jul. 23-26, 2008, pp. 85-90.

"LXC", From CRIU, last modified on May 28, 2015, 2 pages, <http://criu.org/LXC>.

Banerjee et al.; U.S. Appl. No. 15/210,281, filed Jul. 14, 2016; Entitled "Checkpoing Mechanism in a Compute Embedded Object Storage Infrastructure".

List of IBM Patents or Patent Applications Treated as Related; Dated Jul. 14, 2016; 2 pages.

* cited by examiner

```
execution:
    (X + Y + Z) where
    - X = {obj1, obj4, obj8},
    - Y = {obj5, obj7, obj9},
    - Z = {obj14, obj16, obj20}

Check point helper:
    index-0:  Read X
    index-1:  Store X, Read Y
    index-2:  Store X, Store X, Read Z
    index-3:  SUM (X, Y), Store IMR
    index-4:  SUM (IMR, Z)

Check point permissions:
    index-0:  ALL
    index-1:  ALL
    index-2:  ALL
    index-3:  USER-A
    index-4:  USER-A, USER-C
```

FIG. 7A

| Stage No. | Checkpoint Name | Checkpoint Computation Step | Tenant Permissions | Checkpoint File Location |
|---|---|---|---|---|
| 1 | C1 | FETCH(X) | User-A (private) | /var/lib/user-A/lxc/C1 |
| 2 | C2 | FETCH(Y) | All (public) | /var/lib/lxc/C2 |
| 3 | C3 | SUM(X, Y) | User-A, User-C (private) | /var/lib/user-AC/lxc/C3 |
| .. | .. | .. | .. | .. |
| N | CN | TAR(X) | All (public) | /var/lib/lxc/CN |

CHECKPOINT MECHANISM IN A COMPUTE EMBEDDED OBJECT STORAGE INFRASTRUCTURE

BACKGROUND OF THE INVENTION

The present invention relates generally to the field of object storage architecture, and more particularly to using checkpoints in an embedded computation infrastructure built in object storage.

Traditional object storage architecture comprises two entities/node groups: proxy nodes, which are used for distributing the load and request handling; and storage nodes which are responsible for writing in to the disks/storage subsystems. Traditional object storage architecture serves purely as a storage unit and repository, and in order for analysis of the data residing in these storage units (i.e., extracting meaningful information from raw data), it requires an additional client or compute node.

Storlet architecture (i.e., embedded compute infrastructure built-in object storage) comprises a software engine present within the nodes. The end user must frame the computation algorithm and must deploy or pass it to this engine as a normal object PUT operation. Storlet architecture does not require any additional client or compute node to perform analysis of the data, but rather the proxy/storage node itself acts as a compute node and returns the results back to the user. Storlet architecture uses virtual machines (VM) (i.e., Linux Containers, Dockers, KVM, ZeroVM, etc.) deployed on the nodes to perform the computation tasks.

Checkpointing is a technique to add fault tolerance into computing systems. It basically consists of saving a snapshot of the application's state, so that it can restart from that point in case of failure. This is particularly important for long running applications that are executed in vulnerable computing systems. In distributed computing, checkpointing is a technique that helps tolerate failures that would otherwise force long-running applications to restart from the beginning. The most basic way to implement checkpointing, is to stop the application, copy all the required data from the memory to reliable storage (e.g., Parallel file system), and then continue with the execution. Checkpointing implementations should preserve system consistency.

SUMMARY

A method, computer program product, and computer system for leveraging checkpoint restart are provided, the method comprising the steps of: determining, by one or more computer processors, a first set of work stages involved within a first computation algorithm; identifying, by one or more computer processors, a set of permissions associated with each of the first set of work stages; storing, by one or more computer processors, each of the first set of work stages as one or more checkpoints in one or more locations, wherein the one or more locations are based on the set of permissions; deploying, by one or more computer processors, a second computation algorithm, wherein the second computation algorithm comprises a second set of work stages; responsive to determining that a subset of the second set of work stages match with a subset of the first set of work stages, invoking, by one or more computer processors, a dummy container, wherein the dummy container comprises a checkpoint associated with the matching subset of work stages; and executing, by one or more computer processors, the second computation algorithm from the matching checkpoint.

DETAILED DESCRIPTION

In traditional storlet architecture, there is no optimization in terms of workload reduction or reusing the computation tasks performed by each virtual element (container). As a result, the architecture suffers. Embodiments of the present invention provide systems and methods for dynamically capturing checkpoints and maintaining the relationship between the checkpoints and algorithm steps such that they can be reused for similar work stages by other tenants.

Figure 1:
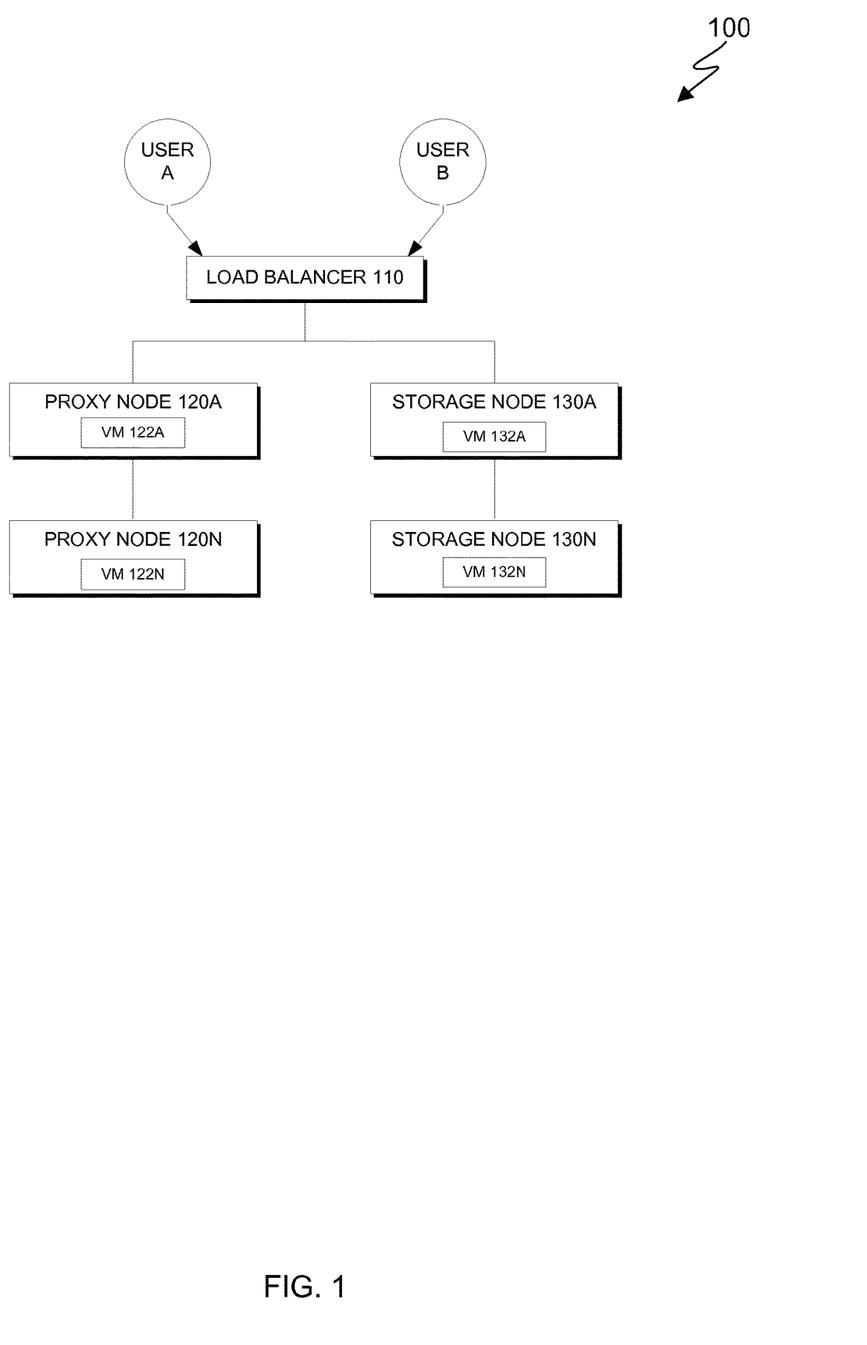
FIG. 1 is a functional block diagram illustrating an embedded computation engine based object storage architecture, in accordance with an embodiment of the present invention.

The present invention will now be described in detail with reference to the figures. FIG. 1 is a functional block diagram illustrating a storlet (embedded compute engine based object storage) architecture ("environment"), generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, environment 100 includes load balancer 110, proxy nodes 120A-N, and storage nodes 130A-N.

Load balancer 110 is a physical machine that determines which proxy node to allocate a request to.

Proxy nodes 120A-N are used for distributing the load and request handling. Proxy nodes 120A-N include VMs 122A-122N, which are embedded computation engines, for analysis and computation. This differs from traditional object proxy architectures in that there is no need for an external compute node to process analysis and computation.

Storage nodes 130A-N are responsible for writing in to the disks and storage subsystems. Storage nodes 130A-N include VMs 132A-132N, which are embedded computation engines, for analysis and computation. This differs from traditional object storage architectures in that there is no need for an external compute node to process analysis and computation.

Figure 2:
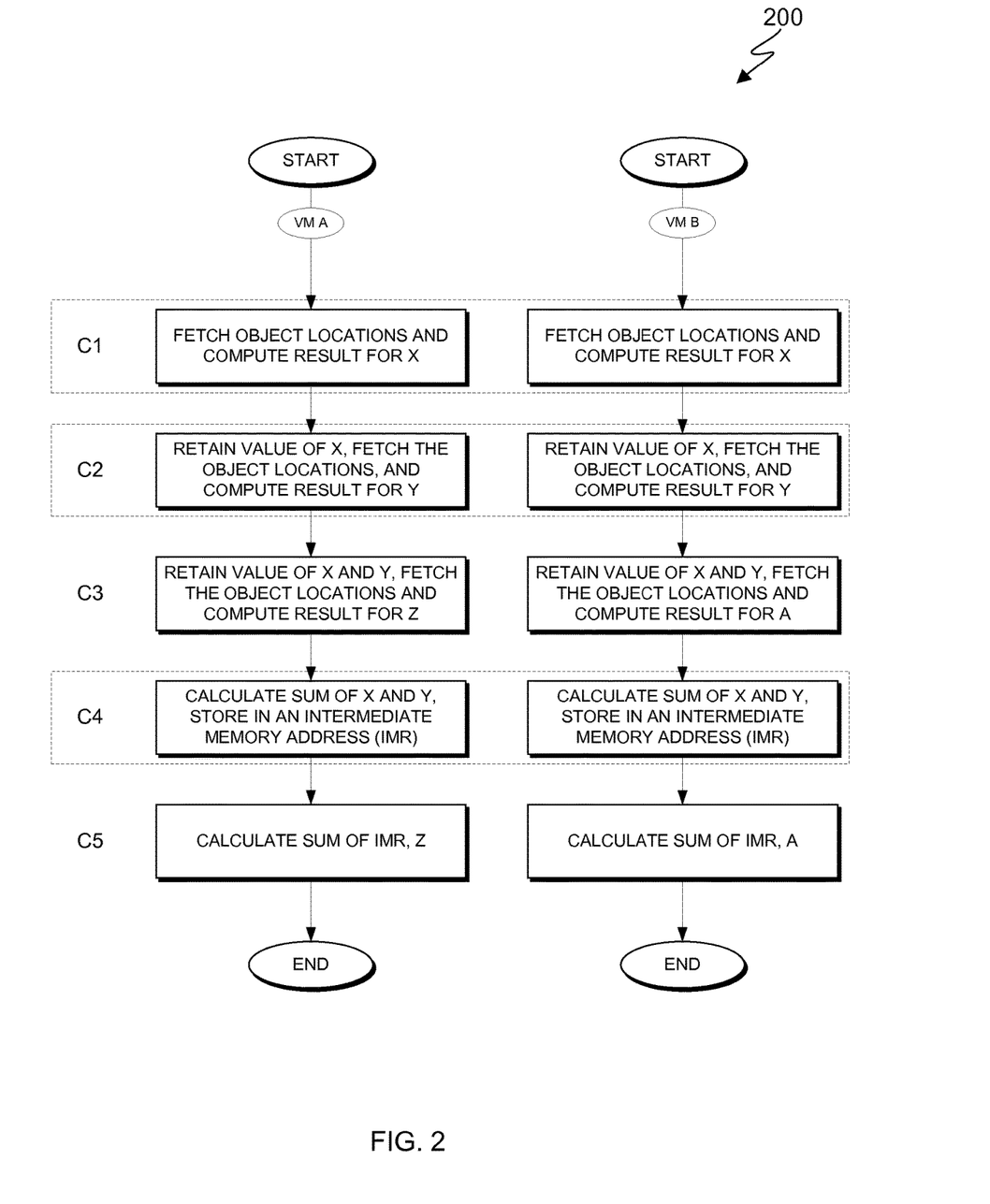
FIG. 2 is a flowchart depicting an example of operational steps for computation execution for two separate user flows, in accordance with an embodiment of the present invention.

FIG. 2 is a flowchart, 200, depicting operational steps for an example of computation execution for two separate user work flows, in accordance with an embodiment of the present invention. In this exemplary embodiment, flowchart 200 illustrates VM A and VM B computation algorithm execution flow.

VM A is a Linux container owned and meant only for User A's computation request. User A's computation algorithm is as follows: SUM(X+Y+Z), where X={obj1, obj4, obj8}, Y={obj5, obj7, obj9}, Z={obj14, obj16, obj20}. Assuming User A computation algorithm is handled by (VM) storage node 130A, the computation execution steps for VM A are as follows. At checkpoint C1, VM A fetches object locations and computes the result for X. At checkpoint C2, VM A retains the value of X, and fetches the object locations and computes the result for Y. At checkpoint C3, VM A retains the value of X and Y, and fetches the object locations and computes the result for Z. At checkpoint C4, VM A calculates the sum of X and Y and stores the sum in an intermediate memory address (IMR). At checkpoint C5, VM A calculates the sum of IMR and Z. It should be appreciated that in this exemplary embodiment VM A is a Linux container, however, any other suitable VM may be used.

VM B is a Linux container owned and meant only for User B's computation request. User B's computation algorithm is as follows: SUM(X+Y+A), where X={obj1, obj4, obj8}, Y={obj5, obj7, obj9}, A={obj40, obj41, obj42}. Assuming User B computation algorithm is handled by (VM) proxy node 120, the computation execution steps for VM B are as follows. At checkpoint C1, VM B fetches object locations and computes the result for X. At checkpoint C2, VM B retains the value of X, and fetches the object locations and computes the result for Y. At checkpoint C3, VM B retains the value of X and Y, and fetches the object locations and computes the result for A. At checkpoint C4, VM B calculates the sum of X and Y and stores the sum in an intermediate memory address (IMR). At checkpoint C5, VM B calculates the sum of IMR and A. It should be appreciated that in this exemplary embodiment VM B is a Linux container, however, any other suitable VM may be used.

In this example, both VM A and VM B utilize five computation steps and therefore carry five checkpoints: checkpoint C1, checkpoint C2, checkpoint C3, checkpoint C4, and checkpoint C5. It should be appreciated that this is only an example, and that there can be more or less than five total checkpoints throughout the duration of a computation execution. However, there is computation overlap between User A's computation request and User B's computation request and is thus a waste of storage unit resources. This computation overlap is seen at checkpoint C1, checkpoint C2, and checkpoint C4.

Figure 3:
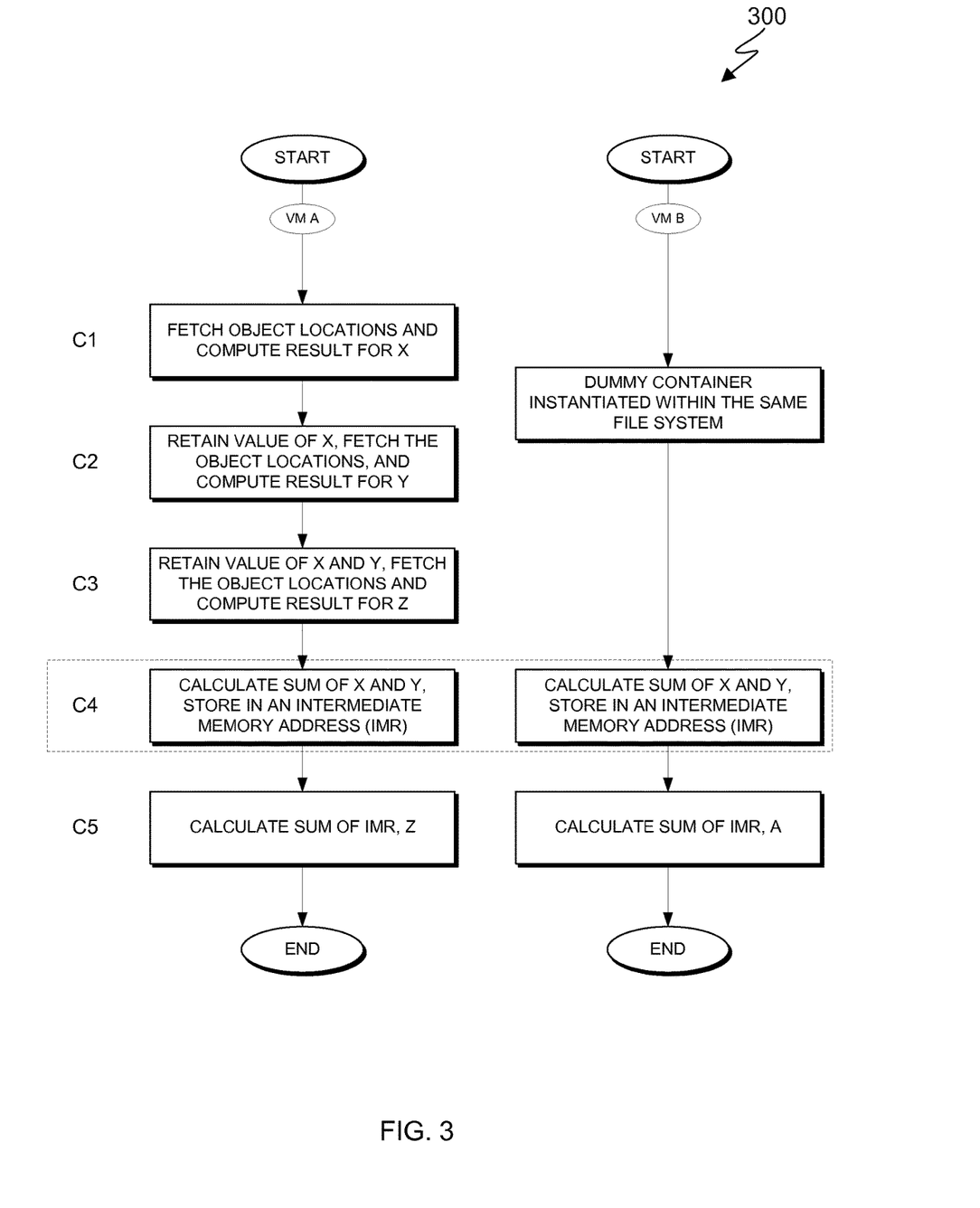
FIG. 3 is a flowchart depicting an example of operational steps for computation execution, in accordance with another embodiment of the present invention.

FIG. 3 is a flowchart depicting an example of operational steps for computation execution, in accordance with an embodiment of the present invention. In this exemplary embodiment, User B's Linux container is reusing checkpoint C4 stored by User A's Linux container. VM A follows the same computation execution as in FIG. 2. In this example, VM B uses a dummy container instantiated within the same file system as VM A to restore action from checkpoint C4. A dummy container, or a blank container, refers to a new fresh container where no specific workload is being assigned (i.e., a virtual machine which booted its operating system and has no user applications running). As such, VM B begins from checkpoint C5 where it calculates the sum of IMR and A.

Figure 4:
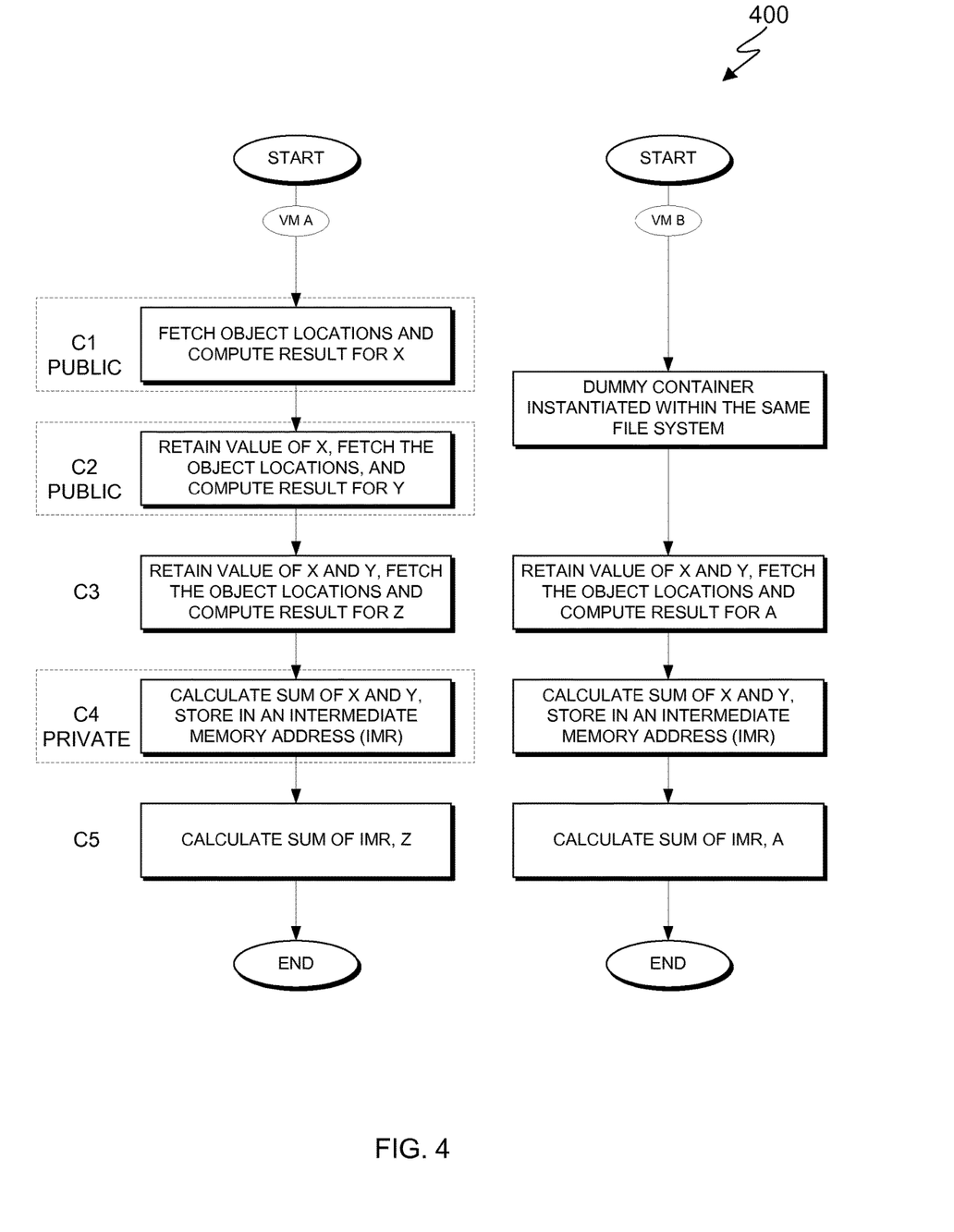
FIG. 4 is a flowchart depicting an example of operational steps for computation execution, in accordance with another embodiment of the present invention.

FIG. 4 is a flowchart depicting an example of operational steps for computation execution, in accordance with an embodiment of the present invention. In this exemplary embodiment, checkpoints C1 and C2 have been marked "public" so that they may be shared among tenants, and thus can be used by User B. Alternatively, checkpoint C4 has been marked as "private" so that it will not be shared among tenants, and can only be reused by User A. In this exemplary embodiment, User B's Linux container is reusing checkpoints C1 and C2 stored by User A's Linux container. In this example, VM B uses a dummy container instantiated within the same file system as VM A to restore action from checkpoint C2. As such, VM B begins from checkpoint C3 where it retains the value of X and Y, and fetches the object locations and computes the result for A. VM B then calculates the sum of X and Y, and stores the sum in an IMR. It should be appreciated that VM B cannot utilize checkpoint C4 stored by VM A because checkpoint C4 in VM A has been marked private. VM B then calculates the sum of IMR and A.

Figure 5:
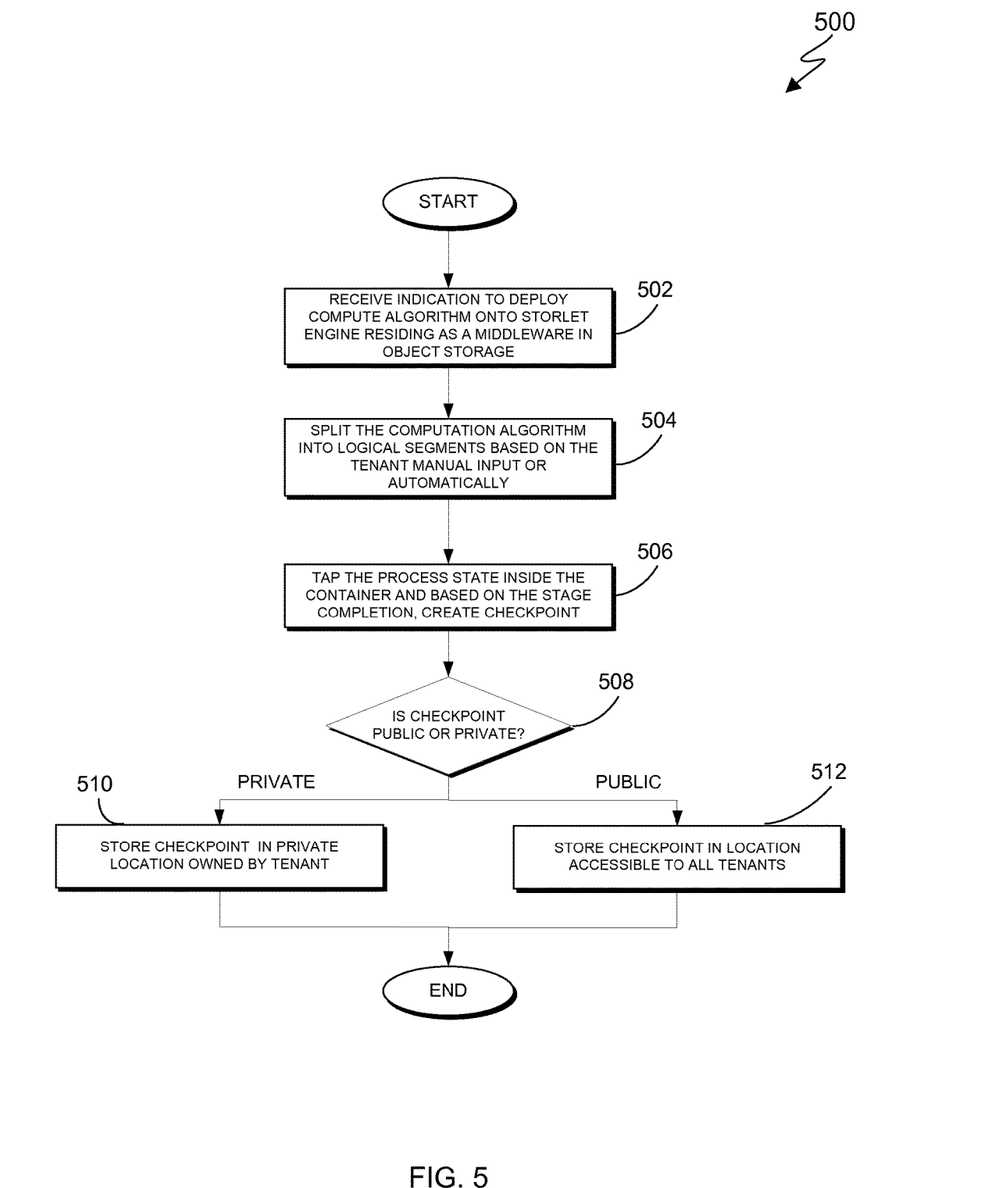
FIG. 5 is a flowchart representing operational steps of an initial checkpoint creation based on the compute algorithm and export permissions, in accordance with an embodiment of the present invention.

FIG. 5 is a flowchart representing initial checkpoint creation based on the compute algorithm and export permissions, in accordance with an embodiment of the present invention. For illustrative purposes, the following discussion is made with respect to storage node 130A and VM 132A; it being understood that the operational steps of FIG. 5 may be performed by any of storage nodes 130A-N using any of VMs 132A-N.

In step 502, Linux container receives an indication from a tenant to deploy a compute algorithm onto the storlet engine residing as a middleware in object storage. In this exemplary embodiment, the compute algorithm is deployed on VM 132A located on storage node 130A. It should be appreciated that in this exemplary embodiment the operating-system-level virtualization environment is a Linux container, however, any other suitable environment may be used.

Figure 7A:
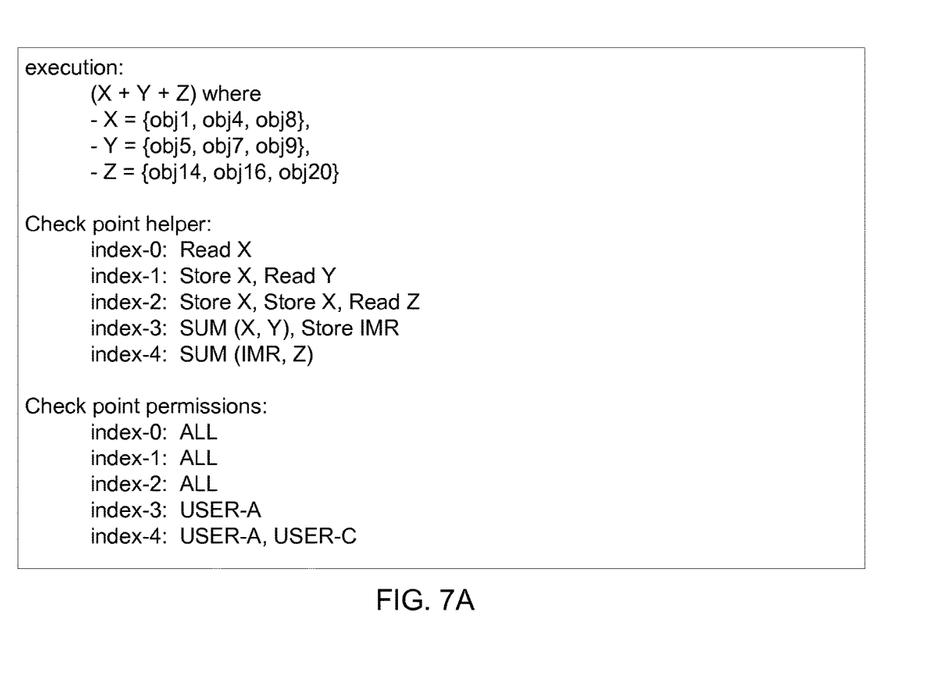
FIG. 7A is an example of a computation algorithm inputted by a user, in accordance with an embodiment of the present invention.

In step 504, Linux container splits the computation algorithm into logical segments, or work stages, based on the tenant manual input or automatically. In this exemplary embodiment, Linux container estimates the independent work stages involved within a single compute algorithm. An example of independent work stages is shown in FIG. 2, where each of VM A and VM B consist of five independent work stages. This estimation can be manually fed or can be automatically determined based on a predetermined signal, as shown in FIG. 7A.

In step 506, Linux container taps the process state inside the container and based on the work stage completion, creates a checkpoint.

In step 508, Linux container determines whether the checkpoint is public or private. Checkpoint storage location can be predetermined based on permissions specified by the tenant (see FIG. 7B).

If, in step 508, Linux container determines that the checkpoint is private, then in step 510 Linux container stores the checkpoint in a private location owned by the tenant.

If, in step 508, Linux container determines that the checkpoint is public, then in step 512 Linux container stores the checkpoint in a location that is accessible to all tenants.

Figure 6:
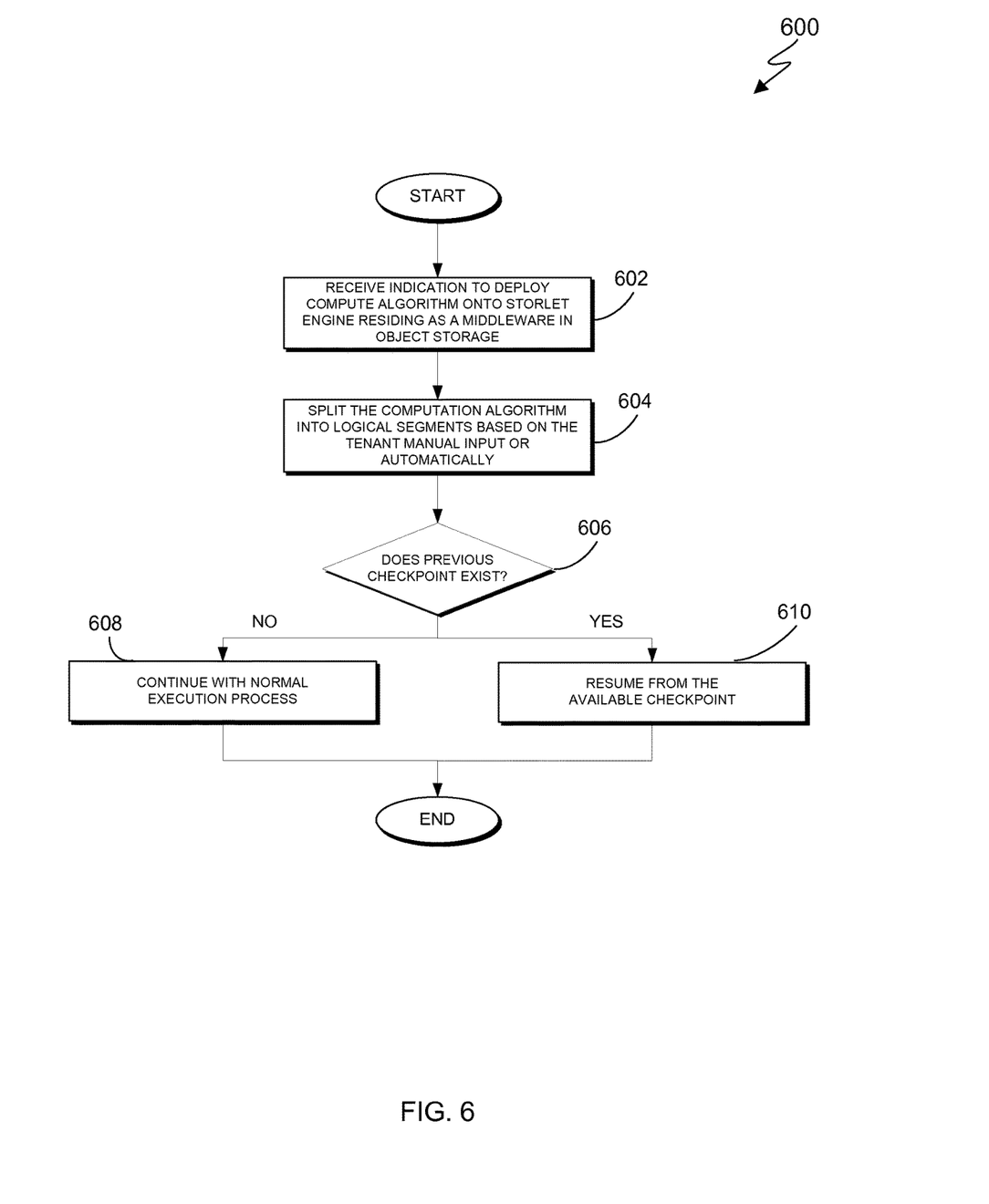
FIG. 6 is a flowchart representing operational steps of the execution flow of computation execution using previously created checkpoints, in accordance with an embodiment of the present invention.

FIG. 6 is a flowchart representing the execution flow of work stage matched with a previously stored checkpoint. For illustrative purposes, the following discussion is made with respect to storage node 130A and VM 132A; it being understood that the operational steps of FIG. 6 may be performed by any of storage nodes 130A-N using any of VMs 132A-N.

In step 602, Linux container receives an indication from the tenant to deploy a compute algorithm onto the storlet engine residing as middleware in object storage. In this exemplary embodiment, the compute algorithm is deployed on VM 132A located on storage node 130A. It should be appreciated that in this exemplary embodiment the operating-system-level virtualization environment is a Linux container, however, any other suitable environment may be used.

In step 604, Linux container splits the computation algorithm into logical segments, or work stages, based on the tenant manual input or automatically. In this exemplary embodiment, Linux container estimates the independent work stages involved within a single compute algorithm. This estimation can be manually fed or can be automatically determined based on a predetermined signal flow, as shown in FIG. 7A.

In step 606, Linux container determines whether a previous checkpoint exists. In this exemplary embodiment, Linux container accesses the checkpoints stored in step 510 and 512 (FIG. 5). If a checkpoint has been designated as private by another tenant, then that checkpoint does not exist with respect to the current tenant. However, if a checkpoint has been designated as private by the current tenant, then that checkpoint exists. Similarly, all public checkpoints exist to all tenants.

If, in step 606, Linux container determines that a previous checkpoint does not exist, then in step 608 Linux container continues with the normal execution process.

If, in step 606, Linux container determines that a previous checkpoint does exist, then in step 610 Linux container resumes from the available checkpoint. In this exemplary embodiment, Linux container invokes a dummy container and resumes computation execution from the best matched checkpoint. This step is illustrated in FIG. 3 and FIG. 4.

FIG. 7A is an example of a computation algorithm inputted by a user, in accordance with an embodiment of the present invention. In this exemplary embodiment, the user has the flexibility to define the work stages and permissions for a computation algorithm.

Figure 7B:
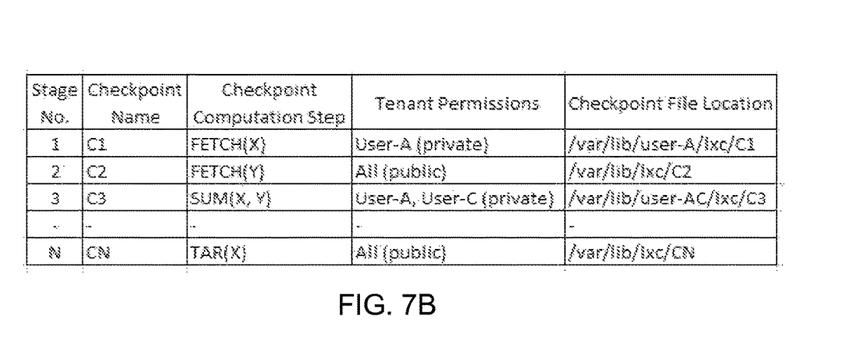
FIG. 7B is an example of previously created checkpoint storage location determination, in accordance with an embodiment of the present invention.

FIG. 7B is an example of previously created checkpoint storage location determination, in accordance with an embodiment of the present invention. In this exemplary embodiment, checkpoint storage location permissions are specified by the tenant. For example, in work stage number 1, User-A has specified checkpoint C1 to be private and thus can only be accessed by User-A. Whereas in work stage number 2, checkpoint C2 has been specified as public and can be accessed by all tenants.

Figure 8:
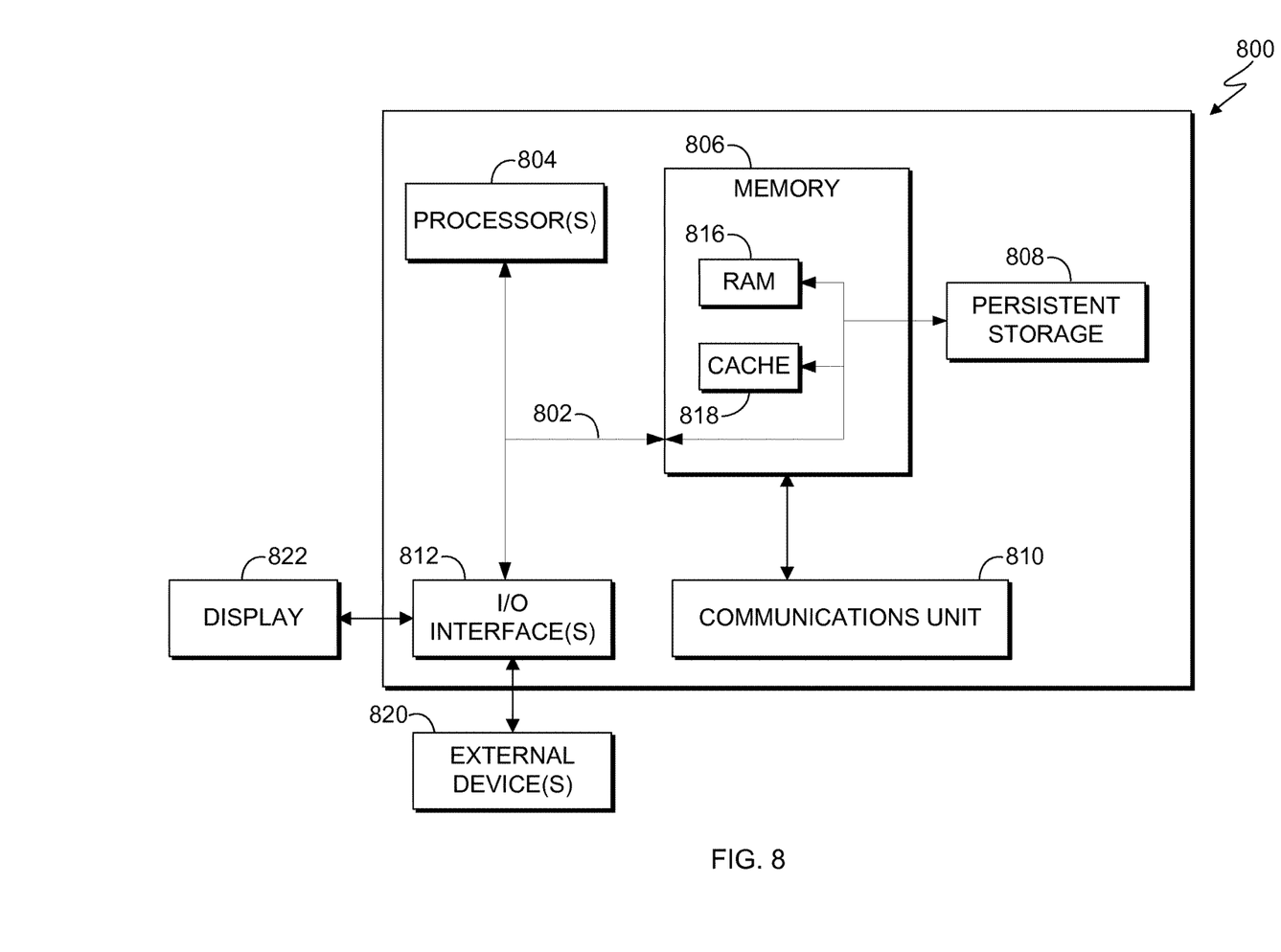
FIG. 8 is a block diagram of internal and external components of a computer system, in accordance with an embodiment of the present invention.

FIG. 8 is a block diagram of internal and external components of computing device 800, which is representative of the computing devices of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 800 includes communications fabric 802, which provides for communications between one or more processing units 804, memory 806, persistent storage 808, communications unit 810, and one or more input/output (I/O) interfaces 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM) 816 and cache memory 818. In general, memory 806 can include any suitable volatile or non-volatile computer readable storage media. Software is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer readable storage medium that is also part of persistent storage 808.

Communications unit 810 provides for communications with other computer systems or devices via a network. In this exemplary embodiment, communications unit 810 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 800 through communications unit 810 (i.e., via the Internet, a local area network, or other wide area network). From communications unit 810, the software and data can be loaded onto persistent storage 808.

One or more I/O interfaces 812 allow for input and output of data with other devices that may be connected to computing device 800. For example, I/O interface 812 can provide a connection to one or more external devices 820 such as a keyboard, computer mouse, touch screen, virtual keyboard, touch pad, pointing device, or other human interface devices. External devices 820 can also include portable computer readable storage media such as, for example, thumb drives, portable optical or magnetic disks, and memory cards. I/O interface 812 also connects to display 822.

Display 822 provides a mechanism to display data to a user and can be, for example, a computer monitor. Display 822 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
    a computer readable storage medium and program instructions stored on the computer readable storage medium, the program instructions comprising:
    program instructions to identify a set of permissions associated with a first algorithm having a first set of work stages, wherein the first set of work stages include one or more checkpoints, wherein each of the one or more checkpoints reflect a completed output of subset of tasks of the first set;
    program instructions to determine that at least a subset of a second set of work stages matches a subset of the first set of work stages, wherein the second set of work stages is associated with a second computation algorithm;
    program instructions to, responsive to determining that a subset of the second set of work stages match with a subset of the first set of work stages, verify that the matched subset of the second set of work stages has a permission that is equivalent to the set of permissions associated with the subset of the first set of work stages;
    program instructions to, responsive to verifying that the matched subset of the second set of work stages has a permission that is equivalent to the set of permissions associated with the subset of the first set of work stages, instantiate a dummy container with the subset of the first set of work stages and its respectively associated checkpoint;
    program instructions to automatically divide the algorithm according to the matched subset of second set of work stages and execute the second algorithm from the checkpoint of the first subset of work stages that match the second subset of work stages.

2. The computer program product of claim 1, wherein the program instructions stored on the computer readable storage media further comprise:
    program instructions to identify a process state inside a container of the first set of work stages; and
    program instructions to create the one or more checkpoints, based on completion of the first set of work stages.

3. The computer program product of claim 1, wherein the program instructions to identify said set of permissions associated with each of said first set of work stages comprise:
    program instructions to receive an indication from a first user that one or more checkpoints are public, wherein said first user is a user that deploys said first computation algorithm; and
    program instructions to store said one or more public checkpoints, wherein the stored one or more public checkpoints are accessible to all users, which deploy a computational algorithm associated with the stored one or more public checkpoints.

4. The computer program product of claim 1, wherein the program instructions to identify said set of permissions associated with each of said first set of work stages comprise:
    program instructions to receive an indication from a first user that one or more checkpoints are private, wherein said first user is a user that deploys said first computation algorithm; and
    program instructions to store said one or more private checkpoints, wherein the stored one or more private checkpoints are accessible to said first user only.

5. The computer program product of claim 1, wherein said first computation algorithm and said second computation algorithm are deployed on a storlet engine integrated in an object storage architecture.

6. The computer program product of claim 1, wherein the program instructions to store each of said first set of work stages as one or more checkpoints in one or more locations comprise:
    program instructions to determine that, based on said set of permissions, a first checkpoint is private; and
    program instructions to save said first checkpoint in a private location, wherein said private location is accessible to a first user, wherein said first user is a user that deploys said first computation algorithm.

7. The computer program product of claim 6, further comprising:
    program instructions to determine that, based on said set of permissions, a second checkpoint is public; and
    program instructions to save said second checkpoint in a public location, wherein said public location is accessible to all users, which deploy a computational algorithm associated with the saved one or more checkpoints.

8. A computer system comprising:
    one or more computer processors;
    one or more computer readable storage media;
    program instructions stored on the computer readable storage media for execution by at least one of the one or more computer processors, the program instructions comprising:
    program instructions to identify a set of permissions associated with a first algorithm having a first set of work stages, wherein the first set of work stages include one or more checkpoints, wherein each of the one or more checkpoints reflect a completed output of subset of tasks of the first set;
    program instructions to determine that at least a subset of a second set of work stages matches a subset of the first set of work stages, wherein the second set of work stages is associated with a second computation algorithm;
    program instructions to, responsive to determining that a subset of the second set of work stages match with a subset of the first set of work stages, verify that the matched subset of the second set of work stages has a permission that is equivalent to the set of permissions associated with the subset of the first set of work stages;
    program instructions to, responsive to verifying that the matched subset of the second set of work stages has a permission that is equivalent to the set of permissions associated with the subset of the first set of work stages, instantiate a dummy container with the subset of the first set of work stages and its respectively associated checkpoint;

program instructions to automatically divide the algorithm according to the matched subset of second set of work stages and execute the second algorithm from the checkpoint of the first subset of work stages that match the second subset of work stages.

9. The computer system of claim 8, wherein the program instructions stored on the computer readable storage media further comprise:

program instructions to identify a process state inside a container of the first set of work stages; and program instructions to create the one or more checkpoints, based on completion of the first set of work stages.

10. The computer system of claim 8, wherein the program instructions to identify said set of permissions associated with each of said one or more work stages comprise:

program instructions to receive an indication from a first user that one or more checkpoints are public, wherein said first user is a user that deploys said first computation algorithm; and program instructions to store said one or more public checkpoints, wherein the stored one or more public checkpoints are accessible to all users, which deploy a computational algorithm associated with the stored one or more public checkpoints.

11. The computer system of claim 8, wherein the program instructions to identify said set of permissions associated with each of said first set of work stages comprise:

program instructions to receive an indication from a first user that one or more checkpoints are private, wherein said first user is a user that deploys said first computation algorithm; and program instructions to store said one or more private checkpoints, wherein the stored one or more private checkpoints are accessible to said first user only.

12. The computer system of claim 8, wherein said first computation algorithm and said second computation algorithm are deployed on a storlet engine integrated in an object storage architecture.

13. The computer system of claim 8, wherein the program instructions to store each of said first set of work stages as one or more checkpoints in one or more locations comprise:

program instructions to determine that, based on said set of permissions, a first checkpoint is private; and program instructions to save said first checkpoint in a private location, wherein said private location is accessible to a first user, wherein said first user is a user that deploys said first computation algorithm.

* * * * *